United States Patent [19]

Staniszewski

[11] Patent Number: 5,067,846
[45] Date of Patent: Nov. 26, 1991

[54] MOUNTING DEVICE

[75] Inventor: Tadeusz Staniszewski, Budd Lake, N.J.

[73] Assignee: Shap Inc., Demarest, N.J.

[21] Appl. No.: 577,285

[22] Filed: Sep. 4, 1990

[51] Int. Cl.⁵ .............................................. F16B 7/04
[52] U.S. Cl. .................................. 403/370; 403/368; 403/259
[58] Field of Search .......................... 403/366-372, 403/259, 261, 290, 334, 195, 197, 194, 256

[56] References Cited

U.S. PATENT DOCUMENTS

| | | |
|---|---|---|
| 602,149 | 4/1898 | White . |
| 1,380,708 | 6/1921 | Ford . |
| 1,673,738 | 6/1928 | Dibner ............................ 403/290 X |
| 2,269,132 | 1/1942 | Soderqvist . |
| 3,131,955 | 5/1964 | Kopec ............................ 403/368 |
| 3,352,343 | 11/1967 | Stitt ............................... 403/256 X |
| 3,957,381 | 5/1976 | Schafer . |
| 4,202,644 | 5/1980 | Soussloff ........................ 403/369 |
| 4,345,851 | 8/1982 | Soussloff . |
| 4,615,640 | 10/1986 | Hosokawa ...................... 403/370 X |
| 4,630,690 | 12/1986 | Beasley et al. ................. 403/370 X |
| 4,645,473 | 2/1987 | Mochizuki ..................... 403/290 X |
| 4,824,281 | 4/1989 | Katsube . |

Primary Examiner—Peter M. Cuomo
Attorney, Agent, or Firm—Thomas L. Adams

[57] ABSTRACT

A mounting device can mount a machine element having a bore coaxially on a shaft. The mounting device has a first member having internal threads. Also, included is a split sleeve having external threads adapted to be mounted around the shaft and inside the bore. The threads of the split sleeve have apexes at a uniform diameter when unstressed. The first member is threaded on the external threads of the split sleeve. The mounting device also has a second member spaced from the first member by an amount sufficient to allow the first and second members to embrance the machine element. The threads of the first member and split sleeve are shaped to cause compression of the sleeve as the first and second members embrace the machine element.

12 Claims, 1 Drawing Sheet

U.S. Patent     Nov. 26, 1991     5,067,846
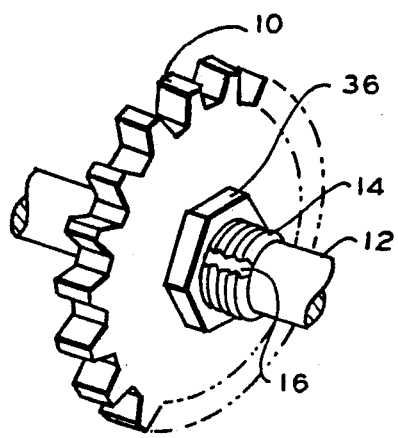
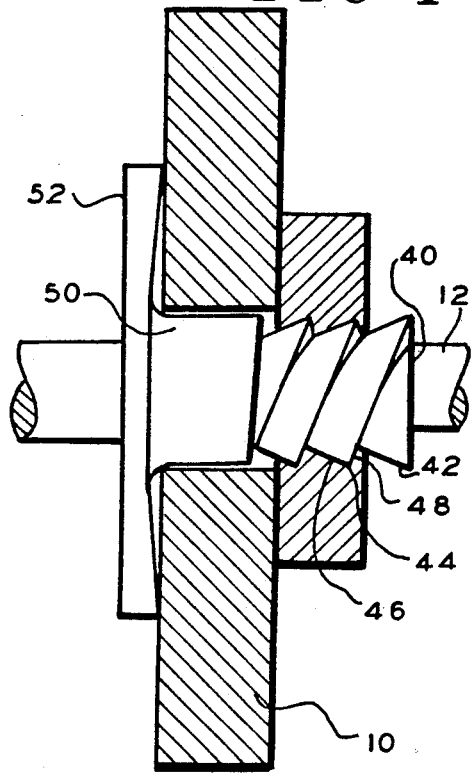
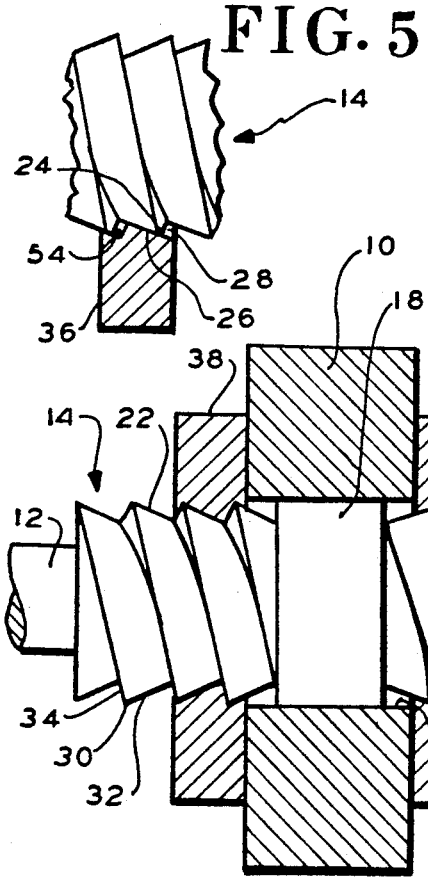

MOUNTING DEVICE

BACKGROUND OF THE INVENTION

The present invention relates to mounting devices and, in particular, to devices for mounting a machine element with a bore coaxially onto a shaft.

A common mechanical objective is to mount a gear, wheel or pulley onto a shaft. One approach is to closely machine the tolerances so that the element on the shaft is centered. The more accurately the bore is machined the better the concentricity, but the higher the cost.

One known system for mounting a gear to a shaft (for example U.S. Pat. No. 4,345,851) employs two coaxial, nested sleeves that are threaded together. The inner sleeve has a frustro-conical exterior that mates with the frustro-conical interior of the outer sleeve. The inner sleeve is slit and split so that threading the two sleeves together compresses and shrinks the inner sleeve. The outer sleeve has circumferentially spaced segments that are pressed outwardly as the sleeves are threaded together. Thus the nested sleeves may be placed around a sleeve and inside a gear so that when tightened, the sleeves engage and center the gear on the shaft.

See also U.S. Pat. Nos. 602,149; 1,380,708; 2,269,132; 3,957,381 and 4,824,281.

A disadvantage with these known mounting devices is the relatively large number of parts required and the relative difficulty of manufacturing them.

Accordingly, there is a need for a mounting device which is relatively simple to make for securely mounting a machine element to a shaft coaxially.

SUMMARY OF THE INVENTION

In accordance with the illustrative embodiments demonstrating features and advantages of the present invention, there is provided a mounting device for mounting a machine element with a bore coaxially on a shaft. The mounting device has a first member having internal threads. The device also has a split sleeve with external threads adapted to be mounted around the shaft and inside the bore. The threads of the split sleeve have apexes at a uniform diameter when unstressed. The first member is threaded on the external threads of the split sleeve. The sleeve has a second member spaced from the first member by an amount sufficient to allow the first and second members to embrace the machine element. The threads of the first member and the split sleeve are shaped to cause compression of the sleeve as the first and second members embrace the machine element.

By employing apparatus of the foregoing type, an improved mounting device is achieved. In a preferred embodiment, a split sleeve has an unthreaded midsection bordered by a first and second threaded section. Both threaded sections can have right handed threads. Preferably, the apex of each thread is contiguous to an inside and outside slope, wherein the inside slope directed towards the unthreaded midsection is not as steep as the outside slope. In this embodiment, a machine element such as a gear, can be slipped over the sleeve and held in place by members that are threaded onto the opposite threaded sections of the sleeve.

In another preferred embodiment, the sleeve has only one threaded section and an unthreaded section that terminates in a flange having a concave inside face. With this arrangement, only one member needs to be threaded onto the split sleeve.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings wherein:

FIG. 1 is a perspective view of a mounting device mounting a machine element on a shaft;

FIG. 2 is a sectional view along the axis of the shaft of FIG. 1;

FIG. 3 is an end view along lines 3—3 of FIG. 2;

FIG. 4 is a sectional view along the shaft axis of a mounting device that is an alternate to that of FIG. 1; and FIG. 5 is a detailed view of the thread mating between the sleeve and first member of FIG. 1.

DETAIL DESCRIPTION OF THE PREFERRED EMBODIMENTS

Referring to FIGS. 1, 2, and 3 a machine element 10 is shown in the form of a gear, although a wheel, pulley or other element can be employed instead. Gear 10 has central bore 11 into which is mounted a shaft 12, having a cylindrical exterior. Mounted over shaft 12 and inside bore 11 is a split sleeve 14 having a split 16. Sleeve 14 has an unthreaded cylindrical midsection 18 bounded by a first threaded section 20 on one side and on the other by second threaded section 22. Both threaded sections 20 and 22 have right handed threads, although left handed threads can be used if desired.

First threaded section 20 has threads with apexes 24. Apex 24 is bounded by an inside slope 26 and outside slope 28. Outside slope 28 is steeper than inside slope 26. Threaded section 22 has threads, each with a apex 30 having an inside slope 32 and relatively steeper outside slope 34. In this illustrated embodiment, the profile of the threads is a saw tooth, although in other embodiments different profiles may be used. It is desirable, however, that the profiles be asymmetric and that the asymmetry reverses from one side of the gear 10 to the other. In this specific case, the inside slope of the threads is not as steep as the outside slope.

In this embodiment, threaded sections 20 and 22 have threaded onto them a first member 36 and second member 38, respectively. Members 36 and 38 are shown as hexagonal nuts having internal threads with asymmetric threads that complement the threads on sleeve 14.

Referring to FIG. 4, it shows previously illustrated gear 10 mounted around shaft 12. Split sleeve 40 has a threaded section 42 with left handed threads. The apex of each thread of section 42 again has an asymmetric profile with the apex of each thread having an inside slope 46 and relatively steeper outside slope 48. Unthreaded midsection 50 is adjacent to flange 52, which has a concave interior surface.

The facilitate an understanding of the principles associated with the foregoing apparatus, the operation of the device of FIGS. 1-3 will be explained in connection with the partial sectional view of FIG. 5. It will appreciated that the operation of the device of FIG. 4 is substantially the same, except that a flange is replaces one of the rotating members.

The device of FIG. 1 is assembled by first slipping the split sleeve 14 over shaft 12. Sleeve 14 is centered at the position where the gear or other machine element is to be positioned. Thereafter, gear 10 can be centered on the unthreaded midsection 18. Next, members 36 and 38 are threaded onto sections 20 and 22, respectively. The members 36 and 38 are installed in a balanced fashion so that the gear 10 remains centered on the sleeve 14. When the members 36 and 38 are finger tight, they may be tightened with a wrench or other appropriate device. As pressure is increased by turning members 36 and 38, the internal threads of these devices slide on the sleeve 14 as shown in FIG. 5. This sliding produces the gap 54. Consequently, the clearance for sleeve 14 is reduced and sleeve 14 is compressively shrunk. During such compression, split 16 narrows, causing sleeve 14 to grip shaft 12 tightly. It will be appreciated that this operation keeps the gear 10 centered coaxially on shaft 12.

It is to be appreciated that various modifications may be implemented with respect to the above described preferred embodiments. In particular, the threads can have various profiles, depending upon the mechanical advantage which is desired and the need to avoid skipping of the threads. Also the length, thickness and the other dimensions of the illustrated components can be altered depending upon the size of the shaft and gear (or other machine element). Also, the number of threads can be altered depending upon the thickness of the nuts and the desired holding strength.

Obviously many modifications and variation of the present invention are possible in light of the above teachings. It is therefore to be understood that within the scope of the appended claims, the invention may be practiced otherwise than as specifically described.

I claim:

1. A mounting device for mounting a machine element having a bore coaxially on a shaft, comprising:
   a first member having internal threads;
   a split sleeve having a sleeve axis and external threads adapted to be mounted around said shaft and inside said bore, said theads of said split sleeve having apexes at a uniform diameter when unstressed, said first member being threaded on said external threads of said split sleeve, said sleeve including:
   a second member spaced from said first member by an amount sufficient to allow said first and second members to embrace said machine element, the threads of said first member and said split sleeve being shaped with an asymmetrical profile to cause compression of said sleeve as said first and second members embrace said machine element, said first and said second members having opposing faces transverse to said sleeve axis and shaped to compress said machine element axially outside said bore.

2. A mounting device according to claim 1 wherein each apex of each of said threads of said first member and said sleeve are bounded by an outside and an inside slope, said outside slope being steeper than said inside slope, so that the inside slope of said first member can slide upon the inside slope of said sleeve to compress it.

3. A mounting device according to claim 2 wherein said profile has a sawtooth shape.

4. A mounting device according to claim 3 wherein said sleeve has a midsection with a unthreaded cylindrical exterior.

5. A mounting device according to claim 1 wherein said second member has internal threads, said external threads of said sleeve having a first and second section with different asymmetrical profiles, said first and said second member being threaded onto said first and second section, respectively.

6. A mounting device according to claim 5 wherein each apex of each of said threads of said sleeve and said first and second members are bounded by an outside and an inside slope, said outside slope being steeper than said inside slope, so that the inside slope of said first and second member can slide upon the inside slope of said first and second section, respectively.

7. A mounting device according to claim 6 wherein said profile has a sawtooth shape.

8. A mounting device according to claim 7 wherein said sleeve has a midsection with an unthreaded cylindrical exterior.

9. A mounting device according to claim 1 wherein said second member comprises a flange integral with said sleeve.

10. A mounting device according to claim 9 wherein said flange has a concave inside face.

11. A mounting device according to claim 10 wherein said profile has a sawtooth shape.

12. A mounting device according to claim 11 wherein said sleeve has a midsection with an unthreaded cylindrical exterior.

* * * * *